Dec. 28, 1954     F. MEAUZE ET AL     2,698,260
METHOD OF APPLYING A BONDING AGENT TO MINERAL
WOOL, EXCESS REMOVAL, AND DRYING THEREOF
Filed Nov. 14, 1951     2 Sheets-Sheet 1

INVENTORS:
FRANÇOIS MEAUZE' AND
VALENTINO WIQUEL
BY

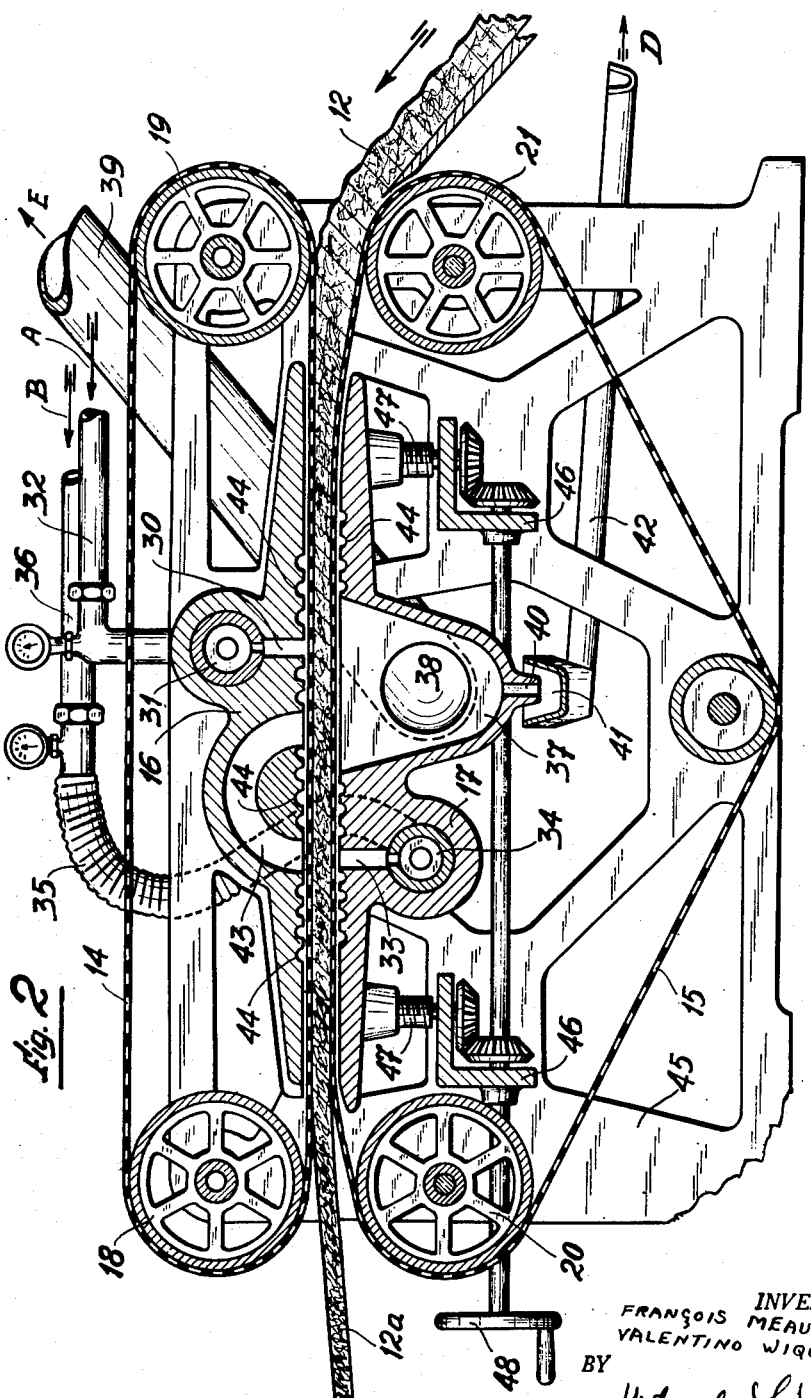

United States Patent Office 2,698,260
Patented Dec. 28, 1954

2,698,260

METHOD OF APPLYING A BONDING AGENT TO MINERAL WOOL, EXCESS REMOVAL, AND DRYING THEREOF

François Meauze, Milan, and Valentino Wiquel, Besana Brianza, Italy, assignors to Vetreria Italiana Balzaretti Modigliani S. p. A., Livorno, Italy Application November 14, 1951, Serial No. 256,318

14 Claims. (Cl. 117—102)

This invention relates to a method and apparatus for manufacture of mineral wool materials of the kind known as mats, and more particularly it relates to certain new and useful improvements in method and apparatuses for manufacture of fiber glass wool layers combined with a bonding agent to produce a strong self-sustaining, rigid or semi-rigid mass in form of plates, panels and the like, as it may be cut from continuous layers of material of the above character having uniform width, thickness and consistency.

The main object of this invention is to provide a new and improved method for mass production of bonded glass wool layers each portion and point of which have quite uniform physical and mechanical characteristics and which may be commercially produced by a relatively simple, small-sized and inexpensive apparatus or plant capable of large uninterrupted production.

Great difficulty has hitherto been experienced in manufacture of materials of the character described, and more particularly, in mass-production of same in the desirable absolute uniformity of product and relatively low costs in workmanship, plants and manufacture. In the prior art, most bonded glass-wool panels and layers have been produced by spraying a binding agent of the thermo-drying type, Bakelite or phenolic glues for example, on the surface of a very soft mat of pure glass-wool, by pressing the said mat to the desired thickness and by having the binding agent dried into an oven or by a blow of hot air. The above known methods are subject to some objections, and particularly the mass production of the above material requires excessively large sized plants and ovens; moreover the drying process is very slowly developed owing to the high insulating characteristic of glass wool; the binding agent proved to be poorly and irregularly divided into the glass-wool mass owing to the relative inefficiency of the spraying process (the preferable method of plunging the mat into a bath of soluble or emulsionable binder have been proved too costly for commercial purposes, owing to the excessive waste of binder), and the drying process obtained by conventionally actuated and operating hot air blowing apparatus cannot exert an uniform drying action owing to differences of penetration of the blown air in the glass-wool mass; in addition, the temperature of the blown air must be confined within relatively low values for avoiding dangerous phenomena of oxidation and burning of the hot material.

Having the above condition in mind, according to this our invention, we provide a new and improved method for carrying on a mass production of bonded material of the character described, by continuous and relatively fast passage of glass-wool mat, any fiber of which has previously been wholly veiled by an extremely thin film of binding agent, under the action of a fast acting heating agent which uniformly and successively exerts an intense and practically instantaneous drying action of quite uniform character on any portion of the passing material.

A further object of this invention, therefore, is the provision of novel features in the drying step of the manufacturing process, for allowing the application of intense heat to the glass-wool material combined with the bonding agent so as to have the above said nearly instantaneous drying step actuated while no burning or oxidation occurs.

Another object of this invention is to provide a new and improved method for continuous manufacture of a material of the above character, in which the step of combining the pure glass-wool with the binding agent is actuated by plunging the said glass-wool into a bath of soluted or emulsionated binder, means being provided for practically total regaining and re-using of the excess of the absorbed binder.

A still further object of this invention is to provide a new and improved method of the above character comprising steps for having the binding agent properly dehydrated before exertion of the above said intense heating action, and more generally, for having the said agent properly arranged for the best development of said drying step.

A still other object of this invention is to provide a new and improved method as above in which the drying step is actuated by applying to the combined material a progressively increasing heating action, in accordance with the experienced conditions for correct drying or polymerization of binding agents of the above character.

Therefore, another object of this invention is to actuate a new and improved apparatus of relatively reduced size and cost, by which a combined material of the above type may be commercially manufactured in a mass-production line according to a method having the above outlined useful features, in combination.

A still further object of this invention is to provide an apparatus as above, comprising operative parts such arranged therein for having the material uniformly and properly treated in any portion thereof, whatever the length, the width and the thickness of same are.

A secondary object of this invention is to provide a new and improved apparatus as above, comprising means for varying the thickness, the density and other characteristic of the produced material within a wide range, according to the commercial requests.

Another secondary object of this invention is to provide a new and improved apparatus of the above type, by which materials of different characteristics and combined with different binding agents may be successfully and usefully manufactured into a continuous layer, by proper adjustment of the same apparatus and of the operative parts thereof.

These and such other objects and features of this invention as may hereinafter appear will be best understood from the following detailed description when read with reference with the accompanying drawings, in which:

Figure 2 is a vertical sectional view of an embodiment of an unit comprised into the apparatus diagrammatically shown by Figure 1, for actuating the steps of transforming a continuous soft layer of glass-wool previously plunged into a bath of soluted or emulsionated binder into a practically rigid bonded layer of the desired thickness and density.

Figure 1:
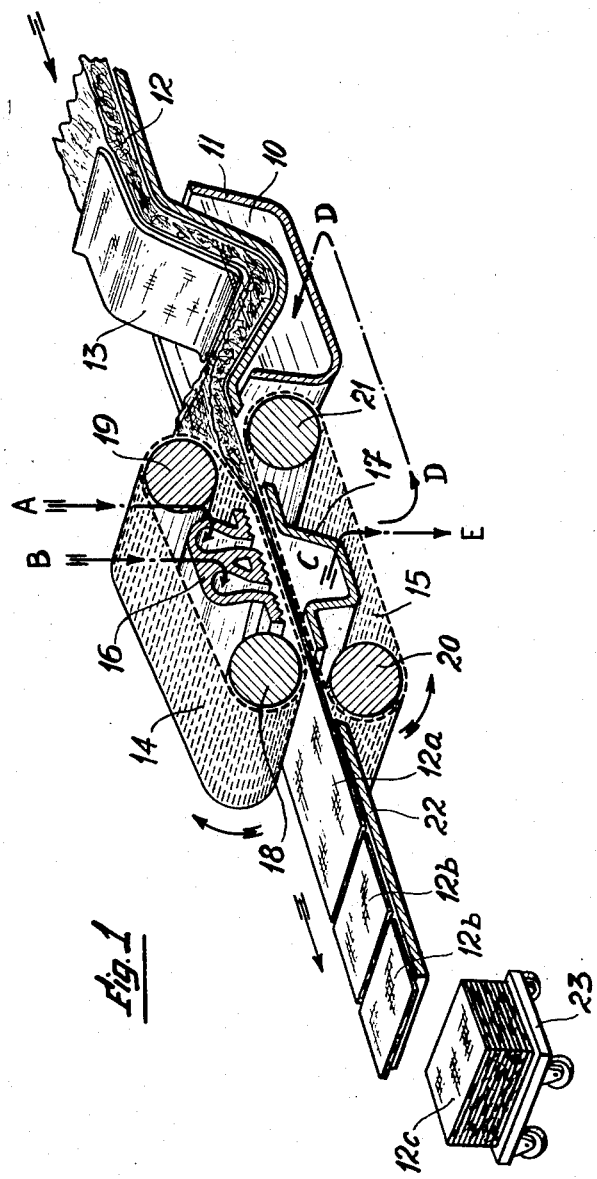
Figure 1 is a diagrammatical perspective sectional view of an apparatus designed to operate according to the method to which this present invention relates.

Referring now to Figure 1: an apparatus according to invention for producing materials of the characteristic described and for attaining the above said object of this invention, comprises a suitable feeding means, a belt conveyor, for example, for continuously feeding a layer 12 of pure glass-wool into a liquid mass 10 comprised in a suitable container 11, means being provided for urging the said layer 12 beneath the surface of said liquid mass, a guiding plate 13 for example, and for successively raising the throughoutly wet layer from said liquid mass and for conveying same into the inlet portion of a second conveying means comprised into the squeezing and drying unit which will described in detail as this description proceeds; the above said operative parts will not be described and shown in detail owing to the fact that said parts may be actuated by using current knowledge in the art, and that same parts are not comprised in the matter which will be claimed as new and forming characteristic of this application. However, said feeding and wetting operative parts are shown in the accompanying Figure 1 to make easier the following disclosure of characteristics and advantages of the method according to this invention.

The said squeezing and drying unit constitutes the main characteristic feature of an apparatus according to the invention, and it comprises, in combination, a conveying means acting on both surfaces of the wet layer, compressing the same into the desired thickness and constructed in such manner to allow a gaseous stream directed in substantially perpendicular direction against one surface of said compressed layer to flow through the same and to escape from its opposite surface, a blowing unit from which a gaseous stream may be projected against said compressed layer, as above, means for substantially confining the said stream in the said imparted direction, and recovery means for regaining both the gaseous matter escaping from the said opposite surface of the compressed layers, and the liquid particles carried away thereby, and for newly introducing said liquid particles in the operative cycle.

More particularly, the said conveying means are formed by two cooperating belt conveyors 14 and 15 acting in opposition on both the surfaces of the fed wet layer, the belts of said belt conveyors being made of some thin and largely perforated material, of flexible metal sheets for example, provided with a plurality of closely spaced holes of reduced area; holes of elongated shape and of size not exceeding ½ of an inch were successfully experienced, the said size being subject to the condition to allow as free as possible passage to the gaseous stream and to avoid any tearing off of glass fibers from the layer by the action of said stream; of course, the indicated size of said holes may be varied in accordance with the characteristics of the treated material, and in particular with the length of the fibers and with the density of the compressed layer.

The co-operating opposite portions of said belt conveyors are sliding on flat opposite faces of two assemblies 16 and 17 respectively, supported by a suitable frame (not shown in Figure 1) in a parallel relationship, the spacing of said flat surfaces being designed for urging the said co-operating portions of conveyors in a such relative spacing for having the layer compressed at the desired thickness. The said conveying belts 14 and 15 are revolved about rollers 18, 19 and 20, 21 respectively, the rollers 19 and 21 being so spaced apart that the spacing of portions of belts 14 and 15, comprised between said rollers and the said opposite flat surfaces of assemblies 16 and 17, progressively decreases from said rollers to said surfaces. In said assemblies 16 and 17 blowing devices and regaining devices are comprised in counterposed arrangement. The number of said blowing devices may be varied in accordance with different requests; however, the use of at least two blowing devices is deemed preferable, for meeting certain conditions of operation which will appear as this description proceeds. Said blowing device comprises a relatively narrow linear nozzle, which extends transversely throughout the width of said surfaces and of said conveying belts, but two lateral reduced zones forming the opposite ends of said nozzle. The width of said nozzle, i. e. its dimension in the direction of movement of the wet layer passing thereunder, must be thus designed to have the following operative condition observed; practically, nozzles formed by cross cuts in said flat surfaces and one inch to ½ inch wide were proved to meet the following conditions. Any nozzle of said blowing devices is connected to a suitable source of a pressurized and heated gaseous matter the characteristics of which will later be indicated, as necessary features of this invention and for the operativeness of our new and improved method.

The regaining device or devices are formed by hollow members (as the one indicated by numeral 17 in Figure 1) having an opening comprised into the flat surface of its relative assembly and so dimensioned and arranged to receive all the gaseous matter blown by said blowing devices and streaming through the two co-operating conveying belts and the wet mat compressed therebetween. Gaskets, gas-trapping grooves or other suitable means of known type are arranged on the said flat surfaces in the portion encircling the openings of said nozzles and of said regaining hollow member to prevent any leaking of the blown gas and to compel same to wholly reach the said regaining device.

On the opposite or exit side of the said unit a conventional receiving table or surface 22 is arranged, said surface 22 being preferably actuated by a conventional belt conveyor (not shown); on said surface the treaded material 12a is delivered in form of an uninterrupted layers and it is cut into panels or plates 12b of the requested size, i. e. in the finished desired product of manufacture which is then carried away by means of any suitable device, by a conventional delivery truck 23 for example, on which truck said panes or plates are successively delivered to form a pile 23.

At this point the novel and improved method according to this our invention will be readily understood from the following description, having in mind the above recited combination of parts, which is necessary for carrying on said method.

The gist of this our invention consists in the use, in an apparatus of the type described, and in operative combination therewith, of one or preferably more streams of gaseous matter, forced through the wet and compressed glass-wool layer, any portion of which will be subject to the action of said stream as said any portion passes in opposition to the nozzles, and of such characteristics for enabling said matter to exert in combination all following actions:

(a) Thoroughly penetrate the glass-wool and blow against any fiber thereof, with speed and inertial mass enough to exert a mechanical action of removing all liquid binding agent present in said wet layer, but to leave an extremely thin film of adhesive character adhering to the surface of any glass fiber.

(b) Act as an gaseous heat-carrier having temperature and heating power enough to raise the temperature of the said extremely thin film to a point at which the watery portion of the liquid mass, comprising the bonding agent, cannot remain in liquid form, upon a very brief passage of said heat-carrier through the compressed wet layer.

(c) Act as an gaseous heat-carrier having temperature and heating power enough to cause the said extremely thin film of dehydrated bonding agent to wholly polymerize, upon a very brief passage of said heat-carrier through the compressed mass of glass-wool combined with said dehydrated bonding agent.

(d) Do not cause any chemical phenomena of oxidation, i. e. of burning, while the said mechanical and thermical actions are exerted.

The above condition (a) is practically met by any gas fed in the nozzle or nozzles of blowing device or devices at a pressure of 40 to 60 lbs./sq. inch about, when a wet mat of thickness not over one inch is treated, and supposing that the gaseous stream is formed by air or other gas of like density, i. e. of like inertial mass.

Above condition (b) is met by a gas having sufficient specific calorific power and fed into the nozzle or nozzles of blowing device or devices at a temperature well above the temperature of ebullition of water (212° Fahr.) at a temperature of 572° Fahr. about, for example.

Above condition (c) is met by a gas of like character fed at a temperature well above the temperature of polymerization of the bonding agent (356° to 464° Fahr.), at a temperature of 752° Fahr. for example.

A plurality of miscarried experiences made clear that it is not absolutely possible to inject air or other gases comprising free oxygen and heated at the above temperatures in a wet mat of the type described, without causing instantaneous oxidation of the combined mass, sometimes with an explosive effect too. According to this our invention, we use a gas having no burning effect, i. e. in which no free and chemically active oxygen is present, as heat-carrier meeting the above conditions (b) and (c).

As preferred gas meeting all above conditions (a), (b), (c) and (d) we use pure and well dried up steam (water-vapor) pressurized and over-heated at the above indicated pressures and temperatures respectively, and fed at the desired conditions by any conventional steam-boiler provided with a conventional over-heating device. While a number of other gases not comprising free oxygen might be used to actuate the new and improved method according to the invention, over-heated steam proved to be very efficient in view of its high specific heating power, i. e. in view of its efficiency in acting as heat-carrier.

Theoretically, in carrying on the method according to this invention, the action indicated by above condition (a) might be exerted by a simple stream of cold air, blown by a first blowing device, and then the actions of points (b) and (c) might be exerted by a gas blown by other blowing devices and meeting, in combination, conditions (b), (d) and (c), (d). On the contrary, the method might be actuated by one stream of gas meeting all above conditions, in combination, and blown by one blowing device; for example, a jet of steam pressurized up to 45 lbs./sq. inch and over-heated up to 750° Fahr. would perform the whole cycle of operations. Practically, the use of a separate cold gas for performing the mechanical action of point (a) was proved useless and requires unduly complexities in construction and in operation of the apparatus, and the use of an unique blowing device slows excessively down the production, it being necessary to keep in constant motion the wet layer under the nozzle at a so little speed that the whole cycle of operations, indicated by above points (a), (b) and (c), could be actuated within the time required by any point of the layer for going through the width of said nozzle. Besides, a practical application of both above said theoretical possibilities will be subject of several other objections.

More particularly, we preferably actuate the said cycle of operation by two successively acting blowing devices, injecting both a stream of dried up, pressurized and over-heated steam through the compressed mat, the first acting (in respect to any portion of passing mat) gaseous stream being formed by steam pressurized up to 45 lbs./sq. in. about and heated up to 572° Fahr. about, and the second acting stream being formed by steam pressurized up 28 lbs./sq. in. about and heated up to 752° Fahr. about. It will be noted that the temperature increases from the first to the second acting stream, in accordance with the thermal conditions meeting the above points respectively (b) and (c); moreover, the said increasing is in correct accordance with the best technique in drying phenolic glues, Bakelite and the like, the application of progressively increasing heat being proved the best in such cases. Besides, it will be noted too that the pressure of first acting stream is higher than the pressure of the second acting one, owing to the fact that the first acting stream only exerts the mechanical action said in above point (a), while the second acting stream is only required to have penetrating power enough to wholly fill all spaces of the mat and to act as heat-carrier for having the action of above point (c) performed. The first acting stream performs in combination both action of above points (a) and (b), the said combination having been experienced very conveniently in view of the fact that while the mechanical action of removing the excess of liquid leaves a thin film of said liquid on the surface of any glass fiber, the thermal action dehydrates said film and makes the same more adherent to the said surface; in general, it may be stated that the first acting stream disposes the material to be quickly and fully treated by the second acting stream. Having the said bonding agent prepared in form of an extremely thin film, quite dehydrated and correctly pre-heated, the polymerization, or drying process will take place and fully develop in a practically instantaneous manner, thus allowing a pretty fast motion of the layer under the action of the blowing units, i. e. thus obtaining the desired mass-production ratio.

Referring now back to Figure 1, it will be described the operation of a basic apparatus for mass-production of the character described, according to our new and improved method: the layer 12, continuously fed by any suitable conveying means, is quite fully and largely imbrued by the liquid comprising the bonding agent, upon passage of said layer under the surface of the liquid mass 10 kept into container 11. Said liquid mass is preferably composed of one part of soluble phenolic glue and ten parts of pure water; phenolic glues of the type used in manufacturing plywood sheets of the type used in building airplanes was very successfully applied.

Such impregnated mat is then brought to the entrance side of the conveying means actuated by said belt-conveyors 14 and 15, and squeezed by the same to the desired thickness.

During the passage of the said wet compressed mat between opposite assemblies 16 and 17, any portion of material will be subjected to the said mechanical and thermal actions exerted by the gaseous streams compelled to pass through the mat, which is at last delivered at the other end of the said conveying means in the form of a finished substantially rigid continuous layer ready to be cut into plates, panels, panes and the like, as requested for transportation and use.

In Figure 1, arrows A and B diagrammatically indicate the feeding of two successively acting blowing devices having operative characteristics as above. Into the hollow of the regaining device all the gas streaming through the mat is trapped, and the excess of liquid carried therefrom by the mechanical action of streaming gas condenses, thus allowing its salvage. In same Figure 1, arrow C—D—D diagrammatically indicates as a conventional duct may bring back the regained liquid (collected in the bottom of the hollow of the regaining device) into container 10. At least, arrow C—E diagrammatically indicates a means for regaining of steam too, for other purposes requesting minor heat and pressure or by re-entering same in cycle, upon re-pressuring and re-heating.

From what above, it will be in addition readily understood that the features of an apparatus according to this our invention allow us to successfully act on a mass of glass-wool which is so fully and largely impregnated by soluted binder that perfect coating of any fiber is made sure; said result is a consequence of the step of plunging the mat in a bath of soluted binder and well under the liquid surface thereof, and at its turn the said step is made commercially actuable by our characteristic feature of cooperative coupling of blowing devices and of regaining devices.

Figure 2 of the accompanying drawings shows an embodiment of the unit comprising said devices; in said figure, parts, members and assemblies equivalent to those previously described with reference to Figure 1, and indicated therein by reference numerals, are indicated by like numerals. According to this form of embodiment of our invention, the apparatus comprises two blowing devices arranged in the two opposite assemblies between which the mat is compelled to pass, for balancing the actions of the gaseous streams in view of their direction of attack. In particular, the nozzle 30 of the first acting blowing device extends transversely to the flat surface of upper assembly 16, and it is fed, through a perforated pipe 31 and an external duct 32, by any convenient source of pressurized and overheated steam, of known type. The nozzle 33 of the second acting blowing device is likewise transversely cut into the flat surface of lower assembly 17, and it is fed through a perforate pipe 34 connected by a flexible pipe 35 to a duct 36 at its turn connected to a convenient source of steam having the above indicated characteristics.

In same lower assembly 17 the trapping and recovering device is located; it consists in a large hollow chamber 37, positioned to face said nozzle 30 and provided with a large side opening 38 communicating with an exhaust duct 39, for steam, and with an opening 40, arranged at the very lower point of its inner surface through which opening the excessive liquid carried away by the above disclosed gaseous stream is exhausted in condensated form and then compelled to reach again the bath, through a channel 41, 42. In said form of embodiment, the stream projected by nozzle 30 is trapped into hollow 37 as it flows outside the lower surface of the mat: the stream projected by nozzle 33, instead, as it escapes from the opposite upper face of the mat, it is trapped into the curved passage 43 comprised in the upper assembly 16 and it is then guided downwardly by said passage to cross again the mat at a position opposed to hollow 37, into which the said second stream is finally trapped too.

As consequence of the above described features, some other valuable advantages are attained: the mat successively attacked by the projected streams at both faces results of quite uniform characteristics whatever its thickness is; the mat is practically crossed by three streams, the second acting stream being compelled to cross twice the mat; the second crossing of the mat by the second acting stream causes a certain counter-pressure in the passage 43, thus making sure the complete filling of all spaces of the mat by said second acting stream, which acts as heat-carrier, as stated above, and which must carry its heat to the very any point of mass to be treated.

All openings of nozzles, passages and hollows on flat surfaces of assemblies 16 and 17 are encircled by grooves 44 or by any other suitable gas-trapping device of known type.

All described operative parts, members and assemblies of the unit are supported by a frame 45, in fixed or rotative relationship therewith, according to the operative character of same parts, but lower assembly 17, which is supported by cross-bars 46 made integral with frame 45, by means of suitable lifting means, for example by screws 47, operatively connected to a suitable controlling means, to a handle 48, for example. The provision of said devices allows raising and lowering of lower assembly 17 in respect to upper assembly 16, i.e., it allows correspondingly varying the spacing comprised between the flat surfaces thereof. As consequence of above, the thickness of the finished mat may be varied at will within all practical requirements. The density of the finished layer, at its turn, may be varied by modifying the ratio "thickness of soft layer 12/spacing of assemblies 16 and 17" and an equivalent variation may be attained too by varying the ratio between the linear speed at which the said soft layer 12 is fed into the unit and the linear speed at which the wet layer is carried through said unit.

It will be understood that the elements of the apparatus described above or parts thereof, and that one or more steps of the described method of manufacture may find useful application in making materials and in producing goods of type other than those described.

While we have illustrated and described the inventions as embodied in a method and means for producing continuous layers of substantially rigid character, formed by a mass of glass-wool combined with a bonding agent of the type of phenolic glues, and the like, we do not intend to be limited to the detail shown, since various modifications and structural changes may be made and alterations in the number, order and arrangement of the steps of manufacturing cycles and methods may be done without departing from the spirit and the scope of this our invention.

Without further analysis the foregoing will so fully reveal the gist of our invention that others can by applying current knowledge readily adapt it for various application without omitting features that, from the standpoint of the prior art, fairly constitute the essential characteristics of the generic or specific aspects of this invention, and, therefore, such adaptations should and are intended to be comprehended within the meaning and range of equivalents of the following claims.

What we claim as new and desire to have protected by Letters Patent is:

1. A method of applying a bonding agent to a layer of mineral wool, comprising the steps of moving a continuous layer of mineral wool in one direction; saturating said layer with a liquid bonding agent of the thermodrying type; and blowing against one surface of a saturated portion of said layer in transverse direction at least one concentrated jet of a hot gaseous medium free of free oxygen at a speed and pressure adjusted to blow out through the opposite surface of said portion of said layer excess liquid bonding agent not adhering to the mineral wool while substantially instantaneously drying the portion of said liquid bonding agent adhering to said mineral wool so that a dried thin adherent film of said bonding agent is formed on said mineral wool.

2. A method of applying a bonding agent to a layer of mineral wool, comprising the steps of moving a continuous layer of mineral wool in one direction; saturating said layer with a liquid bonding agent of the thermodrying type; and blowing against one surface of a saturated portion of said layer in transverse direction at least one concentrated jet of overheated steam at a speed and pressure adjusted to blow out through the opposite surface of said portion of said layer excess liquid bonding agent not adhering to the mineral wool while substantially instantaneously drying the portion of said liquid bonding agent adhering to said mineral wool so that a dried thin adherent film of said bonding agent is formed on said mineral wool.

3. A method of applying a bonding agent to a layer of mineral wool, comprising the steps of moving a continuous layer of mineral wool in one direction; saturating said layer with a liquid bonding agent of the thermodrying type; blowing against one surface of a saturated portion of said layer in transverse direction at least one concentrated jet of a hot gaseous medium free of free oxygen at a speed and pressure adjusted to blow out through the opposite surface of said portion of said layer excess liquid bonding agent not adhereing to the mineral wool while substantially instantaneously drying the portion of said liquid bonding agent adhering to said mineral wool so that a dried thin adherent film of said bonding agent is formed on said mineral wool; trapping the gaseous medium and the excess liquid bonding agent carried by the same after said gaseous medium has passed through said layer; and recovering trapped liquid bonding agent.

4. A method of applying a bonding agent to a layer of mineral wool, comprising the steps of moving a continuous layer of mineral wool in one direction; saturating said layer with a liquid bonding agent of the thermodrying type; and blowing against one surface of a saturated portion of said layer in transverse direction at least one concentrated jet of a gaseous medium free of free oxygen at a speed and pressure adjusted to blow out through the opposite surface of said portion of said layer excess liquid bonding agent not adhering to the mineral wool while retaining a thin adhering film on said mineral wool; and blowing at least one other concentrated jet of a hot gaseous medium free of free oxygen through said thus treated portion of said layer for drying the portion of said liquid bonding agent adhering to said mineral wool so that a dried thin adherent film of said bonding agent is formed on said mineral wool.

5. A method of applying a bonding agent to a layer of mineral wool, comprising the steps of moving a continuous layer of mineral wool in one direction; saturating said layer with a liquid bonding agent of the thermodrying type; blowing against one surface of a saturated portion of said layer in transverse direction at least one concentrated jet of overheated and pressurized steam at a speed and pressure adjusted to blow out through the opposite surface of said portion of said layer excess liquid bonding agent not adhering to the mineral wool while retaining a thin adhering film on said mineral wool; and blowing at least one other concentrated jet of a hot gaseous medium free of free oxygen through said thus treated portion of said layer for drying the portion of said liquid bonding agent adhering to said mineral wool so that a dried thin adherent film of said bonding agent is formed on said mineral wool.

6. A method of applying a bonding agent to a layer of mineral wool, comprising the steps of moving a continuous layer of mineral wool in one direction; wetting said layer with a liquid bonding agent of the thermodrying type; blowing against one surface of a saturated portion of said layer in transverse direction at least one concentrated jet of a hot gaseous medium free of free oxygen at a speed and pressure adjusted to blow out through the opposite surface of said portion of said layer excess liquid bonding agent not adhering to the mineral wool while dehydrating the portion of said liquid bonding agent adhering to said mineral wool; and blowing in transverse direction at least one other concentrated jet of a hot gaseous medium free of free oxygen through said thus treated portion of said layer for instantaneously drying said dehydrated portion of said liquid bonding agent adhering to said mineral wool so that a dried thin adherent film of said bonding agent is formed on said mineral wool.

7. A method of applying a bonding agent to a layer of mineral wool, comprising the steps of moving a continuous layer of mineral wool in one direction; saturating said layer with a liquid bonding agent of the thermodrying type; blowing against one surface of a saturated portion of said layer in a direction perpendicular to said one direction a concentrated jet of a hot gaseous medium free of free oxygen at a speed and pressure adjusted to blow out through the opposite surface of said portion of said layer excess liquid bonding agent not adhering to the mineral wool while dehydrating the portion of said liquid bonding agent adhering to said mineral wool; and blowing at least one other concentrated jet of a hot gaseous medium free of free oxygen in a direction opposite to said perpendicular direction through said thus treated portion of said layer for instantaneously drying said dehydrated portion of said liquid bonding agent adhering to said mineral wool so that a dried thin adherent film of said bonding agent is formed on said mineral wool.

8. A method as claimed in claim 7 and including the steps of trapping said gaseous medium and the excess liquid bonding agent carried by the same after said gaseous medium has passed through said layer; and recovering trapped liquid bonding agent.

9. A method as claimed in claim 8 wherein said gaseous medium is pressurized and overheated steam.

10. A method of applying a bonding agent to a layer of mineral wool comprising the steps of moving a continuous layer of mineral wool in one direction; saturating said layer with a liquid bonding agent of the thermo-drying type; blowing against one surface of a saturated portion of said layer in a direction perpendicular to said one direction a concentrated jet of a hot gaseous medium free of oxygen at a speed and pressure adjusted to blow out through the opposite surface of said portion of said layer excess liquid bonding agent not adhering to the mineral wool, and at a temperature sufficient to dehydrate the film of said liquid bonding agent adhering to said mineral wool; blowing another concentrated jet of a hot gaseous medium free of free oxygen in a direction opposite to said perpendicular direction through said thus treated portion of said layer for drying said dehydrated portion of said liquid bonding agent adhering to said mineral wool; and guiding said other jet of hot gaseous medium after the same has passed through said layer to move in an opposite direction and to pass again through said layer for further drying and polymerizing said film of said liquid bonding agent adhering to said mineral wool so that a dried thin adherent film of said bonding agent is formed on said mineral wool.

11. A method of producing a bonded layer of glass wool comprising the steps of moving a continuous layer of glass wool in one direction; saturating said layer with a liquid glue of phenolic type; compressing said saturated portion of said layer to a desired thickness; blowing against one surface of said impregnated compressed portion at least one concentrated jet of overheated steam at a speed and pressure adjusted to blow out through the opposite surface of said portion of said layer excess liquid glue not adhering to the glass wool, and at a temperature sufficient for instantaneously drying said liquid glue adhering to said mineral wool; trapping steam having passed through said layer and carrying excess of glue; and recovering said trapped excess of glue.

12. A method of producing a bonded layer of glass wool comprising the steps of continuously moving a continuous layer of glass wool in one direction; thoroughly wetting said moving layer with a liquid composed of water and glue of the phenolic type to impregnate a layer portion; progressively compressing the impregnated layer portion to a desired thickness; blowing through said impregnated compressed portion a first concentrated jet of a pressurized steam at a speed and pressure adjusted to carry away excess liquid not adhering to the glass wool, and to retain a thin film of said liquid adhering to the glass wool; blowing through said thus treated portion of said moving layer a second concentrated jet of pressurized and overheated steam at such pressure and speed as to completely fill all inner spaces of the glass wool, and at a temperature above the drying temperature of said phenolic type glue for dehydrating and polymerizing said thin adhering film; trapping said steam having passed through said layer and carrying excess liquid; and recovering said excess liquid containing said glue.

13. A method of producing a bonded layer of glass wool comprising the steps of continuously moving a continuous layer of glass wool in one direction; thoroughly wetting said moving layer with a liquid composed of water and glue of the phenolic type to impregnate a layer portion; progressively compressing the impregnated layer portion to a desired thickness; blowing through said impregnated compressed portion a first concentrated jet of a pressurized overheated steam at a speed and pressure adjusted to carry away excess liquid not adhering to the glass wool, and to retain a thin film of said liquid adhering to the glass wool, and having a temperature above 100° C. for dehydrating said thin film; blowing through said thus treated portion of said moving layer a second concentrated jet of pressurized and overheated steam at such pressure and speed as to completely fill all inner spaces of the glass wool, and at a temperature above the polymerizing temperature of said phenolic type glue for drying and polymerizing said thin adhering film; trapping said steam having passed through said layer and carrying excess liquid; and recovering said excess liquid containing said glue.

14. A method of producing a bonded layer of glass wool comprising the steps of continuously moving a continuous layer of glass wool in one direction; immersing said moving layer into a liquid composed of ten parts of water and one part glue of the phenolic type to impregnate a layer portion; progressively compressing the impregnated layer portion to a desired thickness; blowing through said impregnated compressed portion a first concentrated jet of a pressurized steam at a pressure of 45 lbs./square inch to carry away excess liquid not adhering to the glass wool, and to retain a thin film of said liquid adhering to the glass wool, and having a temperature of 572° F. for dehydrating said thin film; blowing through said thus treated portion of said moving layer a second concentrated jet of pressurized and overheated steam at a pressure of 28 lbs./square inch so as to completely fill all inner spaces of the glass wool, and at a temperature of 752° F. for polymerizing said thin adhering film; trapping said steam having passed through said layer and carrying excess liquid; and recovering said excess liquid containing said glue.

References Cited in the file of this patent

UNITED STATES PATENTS

| Number | Name | Date |
| --- | --- | --- |
| 1,056,915 | Lappan | Mar. 25, 1913 |
| 1,899,056 | Powell | Feb. 28, 1933 |
| 1,931,570 | Brown et al. | Oct. 24, 1933 |
| 1,942,383 | Dickhaut et al. | Jan. 2, 1934 |
| 1,989,455 | Loomis | Jan. 29, 1935 |
| 2,084,150 | Lawrence | June 15, 1937 |
| 2,316,202 | Warner | Apr. 13, 1943 |
| 2,428,113 | Grupe | Sept. 30, 1947 |
| 2,457,784 | Slayter | Dec. 28, 1948 |
| 2,460,206 | Wentz | Jan. 25, 1949 |
| 2,460,571 | Chaffee | Feb. 1, 1949 |
| 2,501,979 | Wood et al. | Mar. 28, 1950 |
| 2,546,230 | Modigliani | Mar. 27, 1951 |